(12) United States Patent
Alimi et al.

(10) Patent No.: US 11,615,060 B2
(45) Date of Patent: Mar. 28, 2023

(54) CONSTRUCTING A MULTIPLE ENTITY ROOT OF TRUST

(71) Applicant: ISARA Corporation, Waterloo (CA)

(72) Inventors: Parnian Alimi, Edmonton (CA); Jiayuan Sui, Burlington (CA); Atsushi Yamada, Waterloo (CA); Robert Williams, Milton (CA); Alessandro Faieta, Kitchener (CA)

(73) Assignee: ISARA Corporation

( * ) Notice: Subject to any disclaimer, the term of this patent is extended or adjusted under 35 U.S.C. 154(b) by 0 days.

(21) Appl. No.: 16/380,548

(22) Filed: Apr. 10, 2019

(65) Prior Publication Data

US 2019/0317924 A1    Oct. 17, 2019

Related U.S. Application Data

(60) Provisional application No. 62/656,672, filed on Apr. 12, 2018.

(51) Int. Cl.
*G06F 16/00* (2019.01)
*G06F 16/182* (2019.01)
(Continued)

(52) U.S. Cl.
CPC ...... *G06F 16/1824* (2019.01); *G06F 16/1834* (2019.01); *H04L 9/0643* (2013.01);
(Continued)

(58) Field of Classification Search
CPC ............ G06F 16/1824; G06F 16/1834; H04L 9/0643; H04L 9/0891; H04L 9/3247;
(Continued)

(56) References Cited

U.S. PATENT DOCUMENTS

| 5,214,702 A | 5/1993 | Fischer |
| 5,610,982 A | 3/1997 | Micali |

(Continued)

FOREIGN PATENT DOCUMENTS

| CN | 106301792 | 1/2017 |
| CN | 106789041 | 5/2017 |

(Continued)

OTHER PUBLICATIONS

"Certificate Transparency", https://www.certificate-transparency.org, Mar. 1, 2018, 2 pgs.

(Continued)

*Primary Examiner* — Paul Kim
(74) *Attorney, Agent, or Firm* — Henry Patent Law Firm PLLC

(57) ABSTRACT

In a general aspect, a multiple-entity root of trust is constructed and maintained for use in a cryptography system. In some aspects, a genesis data block includes genesis block data entries representing respective member entities of a root of trust consortium. A genesis block is generated by digitally signing the genesis data block. The genesis block is provided for use by end entities as a root of trust in a cryptography system. In some aspects, a hash of an existing block of a chain is obtained, and a data block comprising a data entry is generated. The data entry identifies an action by one or more member entities of the root of trust consortium. A new block of the chain is generated by digitally signing a combination of the data block and the hash of the existing block. The new block is provided for use by end entities as the root of trust in the cryptography system.

21 Claims, 8 Drawing Sheets

(51) Int. Cl.
*H04L 9/06* (2006.01)
*H04L 9/32* (2006.01)
*H04L 9/08* (2006.01)
*H04L 9/00* (2022.01)

(52) U.S. Cl.
CPC .......... *H04L 9/0891* (2013.01); *H04L 9/3247* (2013.01); *H04L 9/3263* (2013.01); *H04L 9/3297* (2013.01); *H04L 9/50* (2022.05)

(58) Field of Classification Search
CPC ....... H04L 9/3263; H04L 9/3297; H04L 9/50; H04L 9/3268; H04L 2209/805; H04L 9/3239; H04L 9/3255
See application file for complete search history.

(56) References Cited

U.S. PATENT DOCUMENTS

| | | | |
|---|---|---|---|
| 6,134,327 | A | 10/2000 | Van Oorschot |
| 6,553,493 | B1 | 4/2003 | Okumura et al. |
| 9,660,978 | B1 | 5/2017 | Truskovsky |
| 9,794,249 | B1 | 10/2017 | Truskovsky et al. |
| 9,875,510 | B1 | 1/2018 | Kasper |
| 2001/0018739 | A1 | 8/2001 | Anderson et al. |
| 2002/0118094 | A1 | 8/2002 | Kambara et al. |
| 2004/0193872 | A1 | 9/2004 | Saarepera et al. |
| 2015/0332283 | A1 | 11/2015 | Witchey |
| 2016/0027229 | A1 | 1/2016 | Spanos et al. |
| 2016/0292680 | A1 | 10/2016 | Wilson et al. |
| 2017/0046651 | A1 | 2/2017 | Lin et al. |
| 2017/0250827 | A1 | 8/2017 | Opschroef et al. |
| 2017/0323392 | A1 | 11/2017 | Kasper et al. |
| 2018/0082043 | A1 | 3/2018 | Witchey et al. |
| 2018/0115416 | A1* | 4/2018 | Diehl .................... H04L 9/0838 |
| 2018/0219669 | A1 | 8/2018 | Chen et al. |
| 2018/0227275 | A1* | 8/2018 | Russinovich ....... H04L 63/0435 |
| 2018/0260212 | A1 | 9/2018 | Wisnovsky |
| 2018/0343126 | A1 | 11/2018 | Fallah et al. |
| 2019/0012249 | A1* | 1/2019 | Mercuri ................. G06Q 20/02 |
| 2019/0036711 | A1 | 1/2019 | Qiu |
| 2019/0199535 | A1* | 6/2019 | Falk ..................... H04L 9/0643 |
| 2019/0205873 | A1 | 7/2019 | Kamalsky et al. |
| 2019/0207767 | A1 | 7/2019 | Ahn |
| 2019/0207781 | A1* | 7/2019 | Harpur ................. G06F 16/345 |
| 2019/0372777 | A1 | 12/2019 | Choi |
| 2020/0084194 | A1 | 3/2020 | McMurdie et al. |
| 2020/0145234 | A1 | 5/2020 | Nishijima |
| 2020/0186509 | A1* | 6/2020 | Kursun ............... H04L 63/1466 |
| 2020/0244464 | A1 | 7/2020 | McLean et al. |
| 2020/0327100 | A1* | 10/2020 | Androulaki .......... G06F 16/256 |
| 2020/0334685 | A1 | 10/2020 | Yan |

FOREIGN PATENT DOCUMENTS

| | | |
|---|---|---|
| CN | 107070644 | 8/2017 |
| WO | 2019195940 | 10/2019 |

OTHER PUBLICATIONS

"Namecoin", https://en.wikipedia.org/w/index.php?title=Namecoin&oldid=834457487, Mar. 19, 2018, 4 pgs.
"Pretty Good Privacy", https://en.wikipedia.org/wiki/Pretty_Good_Privacy, Mar. 29, 2018, 10 pgs.
"Public key infrastructure", https://en.wikipedia.org/wiki/Public_key_infrastructure, Dec. 27, 2017, 6 pgs.
"The difference between a Private, Public & Consortium Blockchain", https://www.blockchaindailynews.com/The-difference-between-a-Private-Public-Consortium-Blockchain_a24681.html, Nov. 14, 2017, 6 pgs.
"Web of trust", https://en.wikipedia.org/wiki/Web_of_trust, Mar. 14, 2018, 6 pgs.
Fromknecht, et al., "A Decentralized Public Key Infrastructure with Identity Retention", Nov. 11, 2014, 16 pgs.
Lewison, et al., "Backing Rich Credentials with a Blockchain PKI", Oct. 24, 2016, 19 pgs.
Nakamoto, "Bitcoin: A Peer-to-Peer Electronic Cash System", www.bitcoin.org, 2008, 9 pgs.
Nystrom, et al., "PKCS #10: Certification Request Syntax Specification, Version 1.7", IETF; Network Working Group; Request for Comments: 2986, Nov. 2000, 15 pgs.
WIPO, International Search Report and Written Opinion dated Jun. 25, 2019, in PCT/CA2019/050443, 16 pgs.
USPTO, Notice of Allowance dated Dec. 30, 2020, in U.S. Appl. No. 17/071,451, 17 pgs.
WIPO, International Search Report and Written Opinion dated Jun. 17, 2021, in PCT/CA2021/050081, 13 pgs.
EPO, Extended European Search Report dated Oct. 26, 2021, in EP 19784588.6, 7 pgs.
JPO, Office Action dated Nov. 2, 2021, in JP 2021-501061, 11 pgs.

\* cited by examiner

CONSTRUCTING A MULTIPLE ENTITY ROOT OF TRUST

CROSS-REFERENCE TO RELATED APPLICATIONS

This application claims priority to U.S. Provisional Application No. 62/656,672 entitled "Constructing a Multiple Entity Root of Trust" and filed Apr. 12, 2018. The priority application is hereby incorporated by reference.

BACKGROUND

The following description relates to a multiple-entity root of trust for cryptography systems.

Cryptography systems are used to communicate securely over public channels. For example, some cryptography systems provide confidentiality by encrypting messages, and some cryptography systems provide authenticity through digital signatures. Some cryptography systems operate using public keys, private keys and shared secrets.

DETAILED DESCRIPTION

Figure 1A:
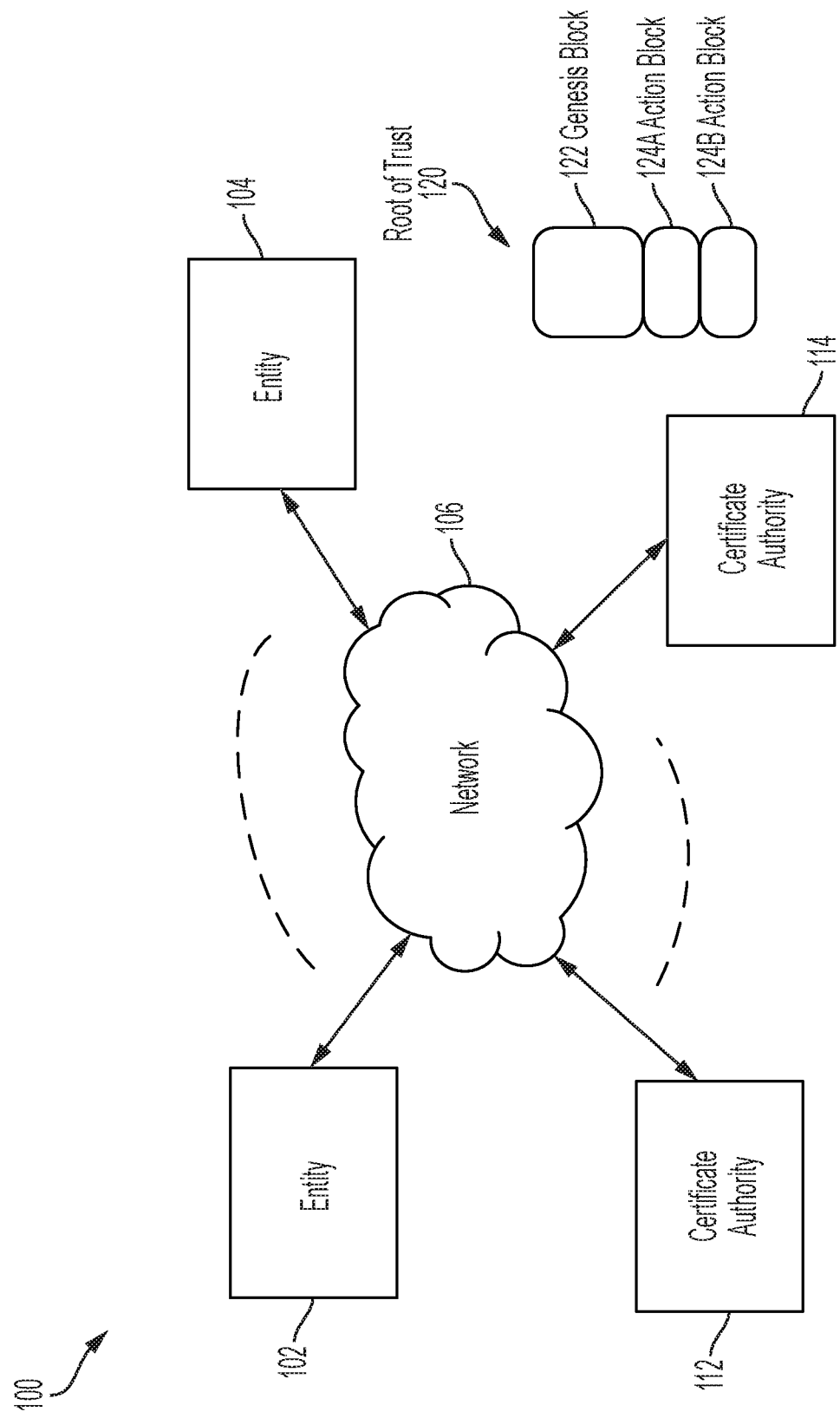
FIG. 1A is a diagram of an example communication system that uses a multiple-entity root of trust.

In some aspects of what is described here, a decentralized root of trust from multiple entities, or another type of multiple-entity root of trust, is constructed for use in a cryptography system. In some instances, implementations of the systems and techniques described here provide technical advantages or improvements over existing technologies. As an example, damage from a compromise of a single entity (e.g., a security compromise arising out of an attack, technical malfunction or other event) can be contained by using a multiple-entity root of trust. For instance, a multiple-entity root of trust may provide a protocol or another formal mechanism to revoke the public key corresponding to the compromised private key from the root of trust, or in some cases, to remove the problematic entity entirely.

Accordingly, aspects of the systems and techniques described here can be used to improve the operation of communications systems (e.g., data networks, etc.), computer systems (e.g., network-connected computers, etc.), smart devices (e.g., so-called "Internet-of-Things" (IoT) devices, etc.) and other classes of technology. For example, a wide variety of modern technologies rely on computer-implemented cryptosystems for secure operation, and the techniques described here can improve such computer-implemented cryptosystems, for example, making them more secure, more efficient or providing other advantages in some instances.

Public key cryptography is extensively deployed in a variety of technologies to achieve secure authentication, secret key sharing, etc. Using a public key, one can validate a digital signature to verify the identity of the communicating party, or to establish a shared secret to securely encrypt a message. Security provided by public key cryptography typically relies on the received public key being securely bound to a legitimate identity in a trusted manner. Without such secure binding, an entity could unknowingly trust the identity of a malicious party that is impersonating the intended party, or send a message to a wrong recipient who is actually an adversary. Two general types of systems have been used to establish trust in a public key that it is bound to a legitimate identity: Public Key Infrastructure (PKI) and web-of-trust.

PKI is currently the most widely deployed mechanism to establish trust in a cryptography system. Conventionally, PKI systems build a hierarchical tree of trusts stemming from a trusted entity referred to as a Root Certificate Authority (Root CA), presenting itself as a root of trust. In a typical PKI system, a CA confirms that a public key belongs to an identity, binds the two with a digital signature, and issues the binding in the form of a digital certificate. Any party (an "end entity") can verify the binding of the public key and an identity by validating the CA's digital signature on the certificate using the CA's public key. Since this validation operation uses the CA's public key, the CA's public key must also be trusted. Therefore, there must be a parent CA that assures that this public key belongs to the CA by issuing a signed certificate. In this manner, the certificates are chained to the Root CA to build trust. And this chain must end somewhere. The last certificate in the chain is the root certificate, which belongs to the end entity referred to as the Root CA. This Root CA serves as the root of trust, and it is represented by its certificate, referred to as the root certificate. A root certificate is self-signed because there is no higher third-party CA to provide assurance. Therefore, a root certificate is trusted in a different manner. Typically, methods such as public knowledge or personal communication are used to trust a root certificate.

Traditional PKI systems face certain technical challenges and vulnerabilities. One of the most important vulnerabilities of a PKI system is the Root CA because it can be a single point of failure. If the Root CA is compromised, it can cause a catastrophic breakdown of security of the entire system. An attacker in possession of a compromised Root CA's private key can issue certificates that are verifiable by the root certificate. This means that the attacker can impersonate any entity in the system, potentially causing catastrophic breakdown of security and trust in the entire system. Therefore, a technology platform that provides a root of trust comprised of multiple entities can provide improved security and efficiency, for example, allowing damages from the security compromise of a single entity to be contained or otherwise mitigated.

In some scenarios, the risks and responsibility of the Root CA (a potential single point of failure in conventional PKI), may hinder the deployment of PKI, leaving the system open to some security vulnerabilities. For example, when attempting to build a single PKI system for a consortium of peer (and possibly competing) organizations, it may be that no single organization wants to be liable for security failures, and thus none of the peer organizations volunteers to take on the role of Root CA. Also, the organizations may not want any higher authority governing them. In such a case, a technology platform that allows for multiple peer entities to establish a root of trust as a committee would be more attractive and agreeable for constructing a PKI to provide improved security and efficiency.

Conventional PKI systems may be ill-prepared for the catastrophic failure resulting from the compromise of the Root CA's private key, for example, since there is no higher trusted entity than the Root CA that has been given power to revoke a root certificate. For instance, a system that does not provide any formal mechanisms to revoke a root certificate or any mechanism for users to identify the no-longer-valid root certificate may be vulnerable. Instead, users of such conventional PKI systems have relied upon public announcements (including e.g. "optional" software updates) and word-of-mouth to identify compromised root certificates. Thus, a technology platform that allows the establishment of a more systematic method to represent and identify revoked root certificates would provide improved security and efficiency.

Another conventional mechanism to build trust in a public key is web-of-trust, which is deployed in systems such as Pretty Good Privacy (PGP). This mechanism was designed to avoid a governing authority, and thus there is no root of trust in a web-of-trust system. Instead, security in a web-of-trust system is based on peer-to-peer trust. For example, this mechanism may be described as a who-knows-who type of "friends" network of trust, where one trusts those whom they know well ("friends") and assures the binding of a friend's public key and identity by digitally signing the friend's digital certificate. When an entity has many friends, the entity can get a number of signatures on its certificate. Therefore, the amount of assurance on a digital certificate can be measured by two criteria: the number of signatures on the certificate, e.g. the number of immediate friends; and the number of hops of chain of certificates (e.g. friends) connected by the signatures to reach the certificate. For example, you may sign the certificate of your immediate friend. Therefore, you trust the certificate because your signature is on the certificate. If it is not your immediate friend's certificate, you may be able to trace the hops of friends until you reach someone you trust, i.e., a friend of a friend. However, one of the notable drawbacks of a conventional web-of-trust is that the trust network must be sizable in order to have a sufficient number of connected paths; otherwise you may not be able to complete the chain to reach to your immediate friend, which means the validation will fail. It may take time to build a sufficiently connected network, and a conventional web-of-trust does not allow a hierarchical structure. Conventional web-of-trust can work well for a peer-to-peer large public network, and in other scenarios. However, it may not always be suitable for an organization such as an enterprise or other organization that has a hierarchical structure. Further, revocation of a certificate in conventional web-of-trust systems can be difficult; since there is no authority to revoke a certificate, revocation is established through consensus. Such a process will likely take a long time, and the users are left at risk during the process.

In some implementations, multiple-entity root of trust systems can provide technical advantages, for example, over conventional PKI systems and conventional web-of-trust systems. For instance, a multiple-entity root of trust system can provide a trust mechanism without a single root of trust but in which hierarchical structures can be constructed. In addition, the multiple-entity root of trust system can provide an efficient mechanism to revoke the certificate of a root of trust entity.

In a multiple-entity root of trust system, a multiple-entity root of trust is used, for example, instead of using of a single root certificate associated with a Root CA. The multiple-entity root of trust can be or can be represented with a data set, for example, a chain of data blocks, that contains identities and public keys of multiple entities. Such a multiple-entity root of trust may represent a consortium of member entities (e.g., a committee, organization or other association of entities); the member entities may function as CAs or end entities (or both) and rely on the multiple-entity root of trust. Because the multiple-entity root of trust represents multiple distinct member entities, no single entity can become a single point of failure. A multiple-entity root of trust data block chain may be published, broadcasted, or distributed (e.g., as a conventional root certificate would be published, broadcasted, or distributed) for use in a cryptography system. The multiple-entity root of trust data block chain also allows dynamic changes to the root of trust consortium by adding new data blocks to the chain, for example, representing a new entity in the consortium, thus providing flexibility and also enabling revocation of entities. In addition, the construction of a multiple-entity root of trust allows for a hierarchical structure, for example, when a member entity also functions as a CA and, as such, can construct a PKI subtree underneath.

In some implementations, a multiple-entity root of trust mechanism reduces at least one layer of hierarchy from a traditional PKI approach since, at least, the Root CA level is removed or replaced. In some cases, if the multiple-entity root of trust system is deployed in the lower layers under the member CA, it may further reduce the number of layers. Additionally, a multiple-entity root of trust's mechanism to manage members' certificates can be agnostic of the underlying cryptographic scheme. As a result, members of the consortium can use one or a collection of signature schemes.

Accordingly, a multiple-entity root of trust can be dynamic and utilize multiple entities. Example mechanisms to build and maintain a multiple-entity root of trust data block chain in a secure manner, which may be deployed in a multiple-entity root of trust technology platform, are described further below.

As an overview of an example implementation, a chain of blocks for a multiple-entity root of trust may be started from a single genesis block. The genesis block can be provided as the initial root of trust established by the founding members of a root of trust consortium. The genesis block may be constructed as follows. For example, the founding members may initially agree to establish a root of trust. Each founding member has a public-private key pair; a public-private key pair of an entity includes a private key and a corresponding public key, which are related as prescribed by a cryptosystem. The private key is kept as a secret of the entity, while the public key can be published to other entities in the cryptosystem. Once the founding member entities are established, the combination of an identity and a public key of each founding member entity is digitally signed by at least one other founding member entity. The sets of data for each founding member entity containing the identity, public key (s), and digital signature(s) of one or more other founding member entities are collected to construct a data block. This data block may then be digitally signed by one or more founding member entities to ensure its integrity and, to record the evidence of approval. These multiple signatures, and the individual signatures on the identity-public-key combinations, can further contribute to prevent a single point of failure. This signed data block becomes the genesis block. The construction of example genesis blocks is described in more detail below with respect to FIGS. 2 and 3.

Whenever changes occur (e.g., in the membership to the root of trust consortium or otherwise) a new block can be chained. Such changes may include the addition or removal of a member, an update, revocation, replacement, addition, or cancellation of a public key of an existing member, or another type of change. A new block containing the information of changes as data entries, can be appended to the existing chain of blocks by a cryptographic process, in which the new block of data is concatenated with a hash of the previous block, and the combination is digitally signed (e.g., multiple times). In some implementations, removal of a block from the chain is not permitted, and the blocks are chained in chronological order. Therefore, by tracking the blocks from the latest to older, the current state of the root of trust consortium membership can be deterministically indicated, allowing to confirm the validity of the public key for an identity.

Damages from a compromise of the private key of a consortium member entity can be contained because such an entity is not a single point of failure. For instance, the risk of such a compromise may be limited to the subnetwork underneath the compromised member entity, and the subnetworks under the other members remain unaffected. Also, the signatures of multiple entities can be provided on each block, such that a compromise of a single entity is not sufficient to alter the membership data in the chain of blocks. This mechanism may also achieve swift revocation of a public key corresponding to a compromised private key or removal of any problematic member in a secure systematic manner.

FIG. 1A is a block diagram showing aspects of an example communication system 100. The example communication system 100 shown in FIG. 1A includes a four nodes—two entity nodes 102, 104, and two certificate authority nodes 112, 114. The nodes communicate with each other over a network 106. The communication system 100 may include additional or different features, and the components in a communication system may be configured as shown in FIG. 1A or in another manner.

In some implementations, nodes in the communication system 100 have a server-client relationship. For example, the node 102 can be a server and the node 104 can be its client in a served network, or vice-versa. In some implementations, nodes in the communication system 100 may have a peer-to-peer relationship. For example, the nodes 102, 104 can be peers in a served network, in a peer-to-peer network or another type of network. Nodes may have another type of relationship in the communication system 100.

In the example shown in FIG. 1A, the example entity nodes 102, 104 and the certificate authority nodes 112, 114 each have computational resources (e.g., hardware, software, firmware) that are used to communicate with other nodes. For example, each of the nodes in the communication system 100 shown in FIG. 1A may be implemented as the example computer system 600 shown in FIG. 6 or components thereof. In some implementations, nodes in the communication system 100 can be implemented in various systems, such as, for example, laptops, desktops, workstations, smartphones, tablets, personal digital assistants, servers, server clusters, mainframes, and other types of computer systems. In some cases, a single device may operate both as an entity node and as a certificate authority node.

In the example shown in FIG. 1A, an end entity (represented by either of the entity nodes 102, 104) or a certificate authority entity (represented by either of the certificate authority nodes 112, 114) may correspond to a computing device, a computer system, an IP address or other network address, or another type of computer-readable identifier or instance of a computer resource. Accordingly, the computations and other operations of each entity may be performed by one or more processors or other elements of the respective node. Similarly, information sent to or received by an entity may be sent to or received by an element (e.g., one or more processors, memories, or interfaces) of the respective node.

The example network 106 can include all or part of a data communication network or another type of communication link. For example, the network 106 can include one or more wired or wireless connections, one or more wired or wireless networks or other communication channels. In some examples, the network 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In some instances, the nodes shown in FIG. 1A communicate with each other in a secure manner based on a multiple-entity root of trust that includes a genesis block and possibly a chain of one or more blocks chained to the genesis block. For instance, the nodes may utilize a cryptography system or another type of system where trust is established based on the example root of trust 120. The example root of trust 120 shown in FIG. 1A includes a genesis block 122 and two action blocks 124A, 124B. The first action block 124A is chained to the genesis block 122, and the second action block 124B is chained to the first action block 124A.

Figure 3:
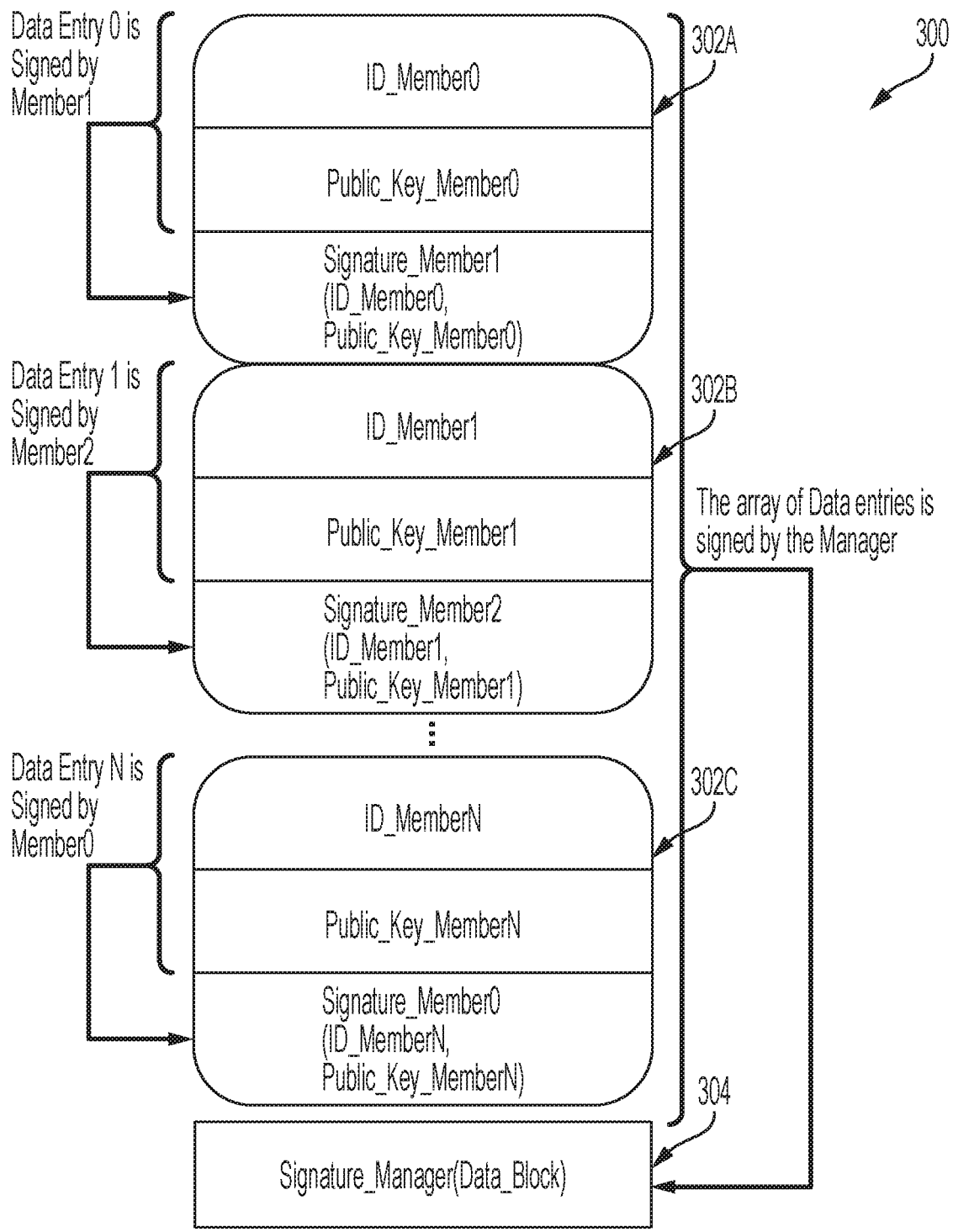
FIG. 3 is a diagram of an example genesis block of a multiple-entity root of trust.
Figure 4:
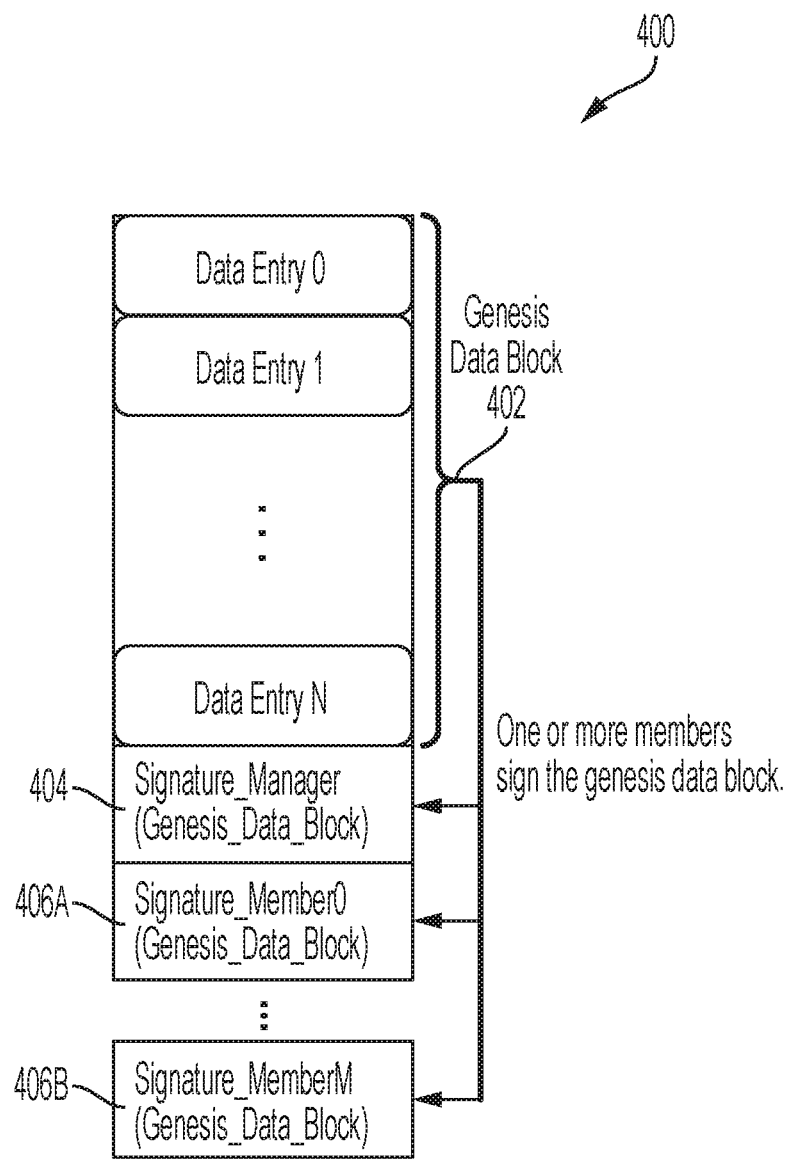
FIG. 4 is a diagram of another example genesis block of a multiple-entity root of trust.
Figure 5A:
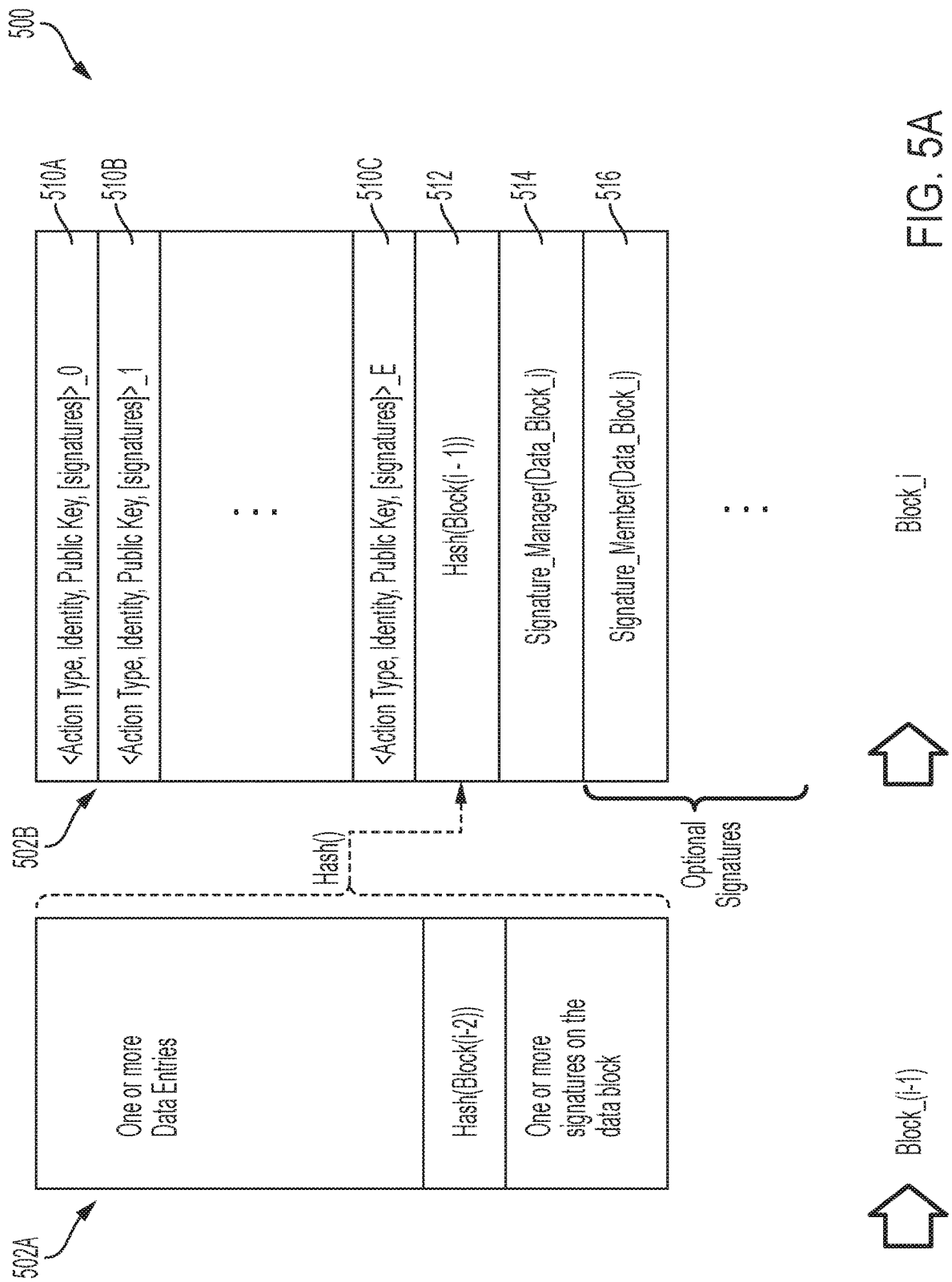
FIGS. 5A and 5B are diagrams showing an example process for adding new blocks to a chain provided as a multiple-entity root of trust.
Figure 5B:
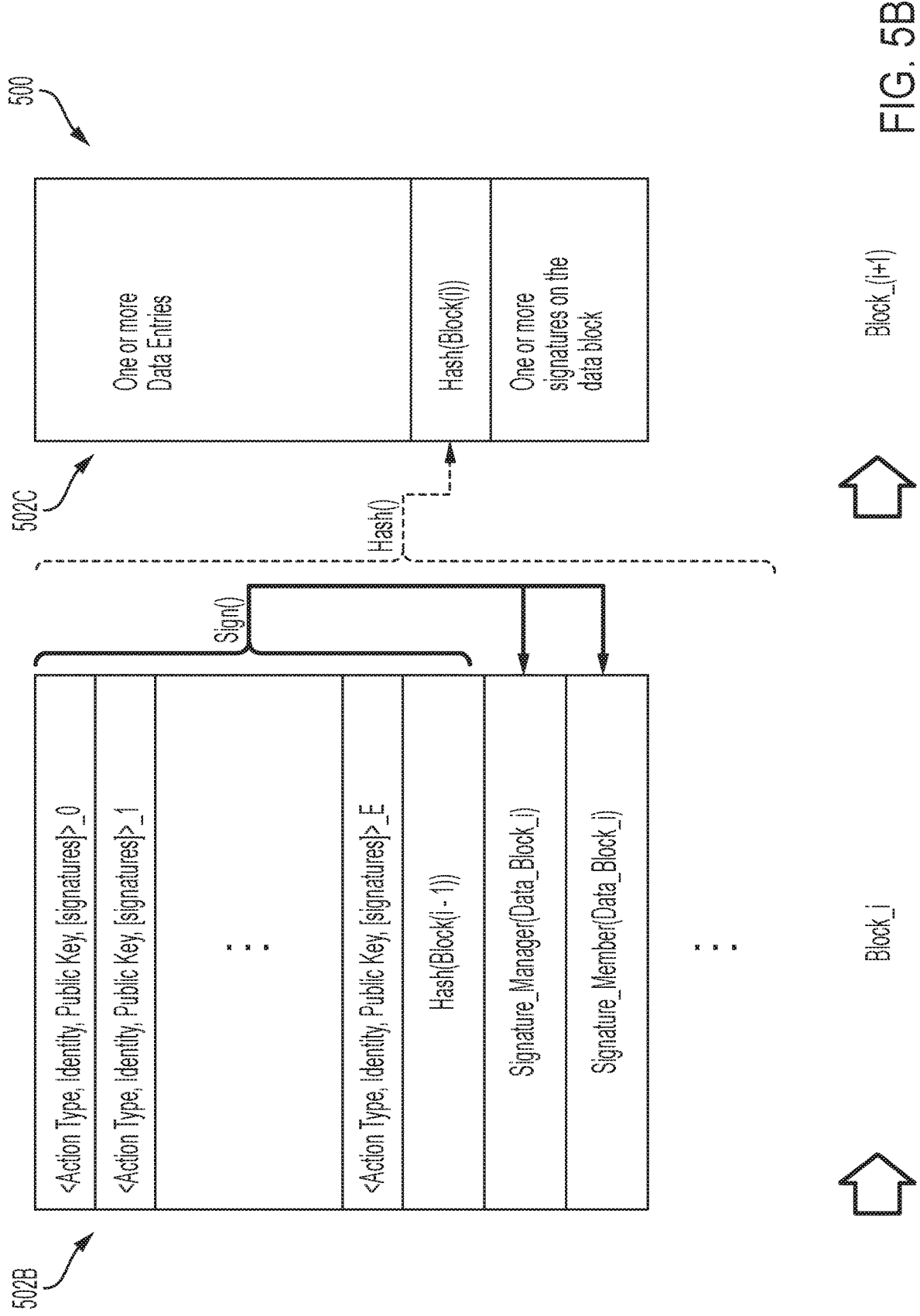

Generally, a multiple-entity root of trust may include only the genesis block 122, or may include any number of action blocks 124. The genesis block 122 is the initial block in a chain that is generated by or on behalf of a root of trust consortium, and the action blocks 124A, 124B represent changes related to the root of trust 120 or the root of trust consortium. Example genesis blocks are shown in FIGS. 3 and 4; example action blocks are shown in FIGS. 5A and 5B. The root of trust 120 may include additional or different types of blocks in some cases.

In some implementations, the certificate authority nodes 112, 114 may issue digital certificates based on the multiple-entity root of trust 120. As an example, the first certificate authority 112 may be a root of trust consortium member whose public key is included in the root of trust 120 (e.g., in the genesis block 122 or in one of the action blocks 124A or both), and the first certificate authority 112 may issue digital certificates that can be validated using the public key in the root of trust 120. Accordingly, other entities may use the root of trust 120 to establish trust in digital certificates issued by the first certificate authority node 112. In some implementations, the second certificate authority node 114 is another root of trust consortium member whose public key is also included in the root of trust 120 (e.g., in the genesis block 122 or in one of the action blocks 124A or both). Alternatively or additionally, the second certificate authority node 114 can be a subordinate CA that is trusted by other entities based on a digital certificate issued by the first certificate authority node 112.

In some implementations, digital certificates issued by the certificate authority nodes 112, 114 may be used by end entities in a manner that is analogous to the use of digital certificates in conventional PKI systems, except that the digital certificates can be validated to the multiple-entity root of trust 120 instead of a conventional root CA certificate. As an example, the end entity 102 may own a digital certificate issued by the certificate authority node 112, wherein the digital certificate contains the end entity's public key and the CA's digital signature that cryptographically binds the end entity's public key with the end entity's identity, so that other end entities can trust the end entity's public key based on validating the CA's digital signature in the digital certificate. Here, the CA's digital signature is trusted because it is validated using a public key in the root of trust 120.

In some instances, the entity nodes 102, 104 and the certificate authority nodes 112, 114 can communicate securely over the network 106 using a cryptography system that establishes trust based on the root of trust 120. For instance, the cryptography system may include cryptographic protocols that use digital certificates that are trusted based on the multiple-entity root of trust 120.

In some cases, the nodes 102, 104 use a digital signature scheme that allows each node to verify the authenticity of messages received from the other node. The digital signature scheme can be, for example, an elliptic curve cryptography (ECC) based signature scheme, an RSA-based signature scheme, a lattice-based signature scheme, a code-based signature scheme or a scheme that uses another type of cryptography. When a digital signature is validated using the signer's public key, the validator may establish trust in the signer's public key based on the root of trust 120.

In some cases, the nodes 102, 104 use an encryption scheme that allows each node to send confidential messages to the other nodes. The encryption scheme can be, for example, an elliptic curve cryptography (ECC) based encryption scheme, an RSA-based encryption scheme, a lattice-based encryption scheme, a code-based encryption scheme or a scheme that uses another type of cryptography. When a message for a recipient is encrypted using the recipient's public key, the sender may establish trust in the recipient's public key based on the root of trust 120.

Figure 1B:
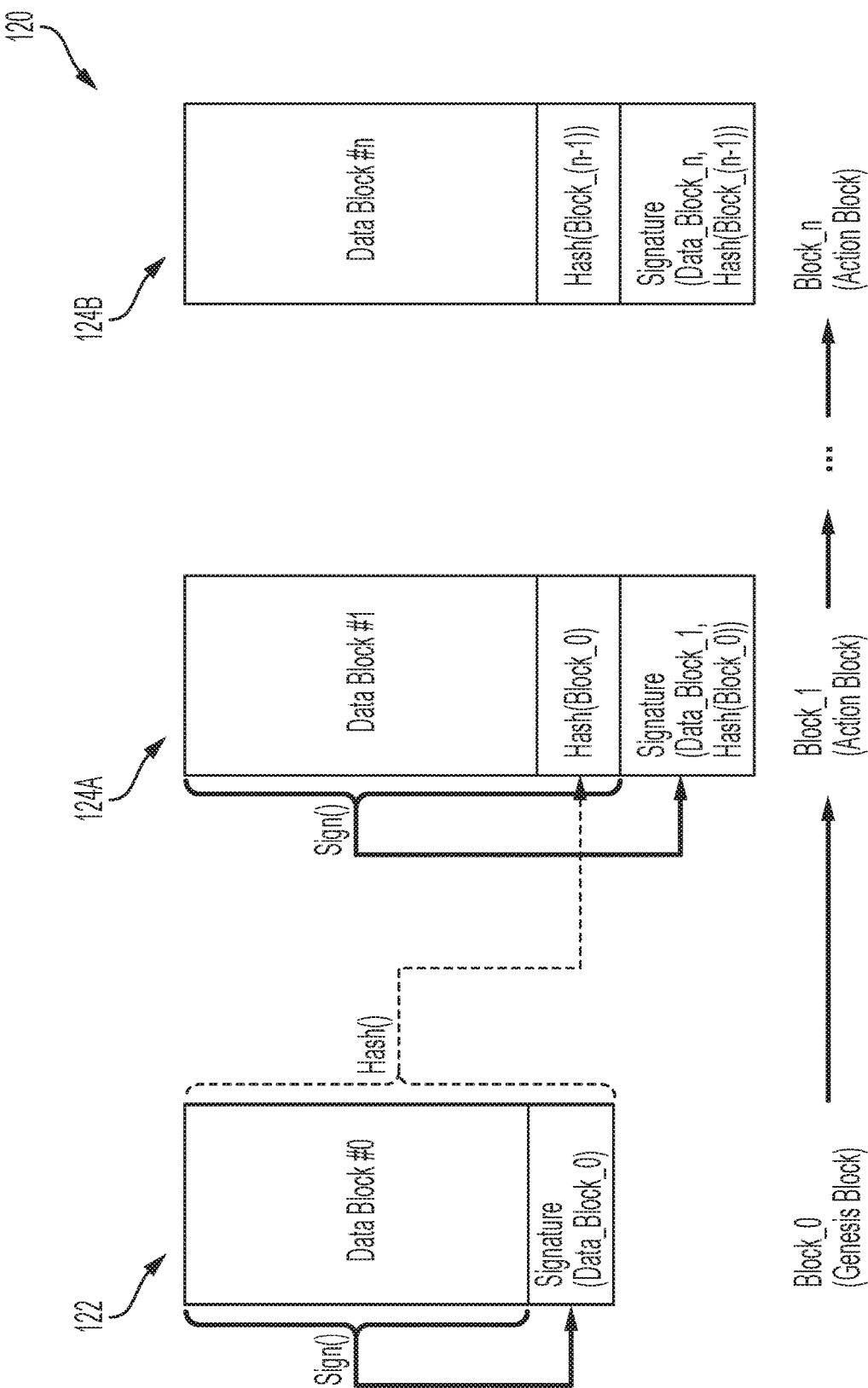
FIG. 1B is a diagram of an example block chain that can be used as the root of trust 120 in FIG. 1A.

FIG. 1B is a diagram of an example block chain that can be used as the root of trust 120 in FIG. 1A. The example block chain represented in FIG. 1B includes blocks chained in sequence, e.g., using a block chaining technique according to a consortium blockchain protocol. Unlike public blockchain protocols (e.g., the blockchain technology used by Bitcoin and other forms of cryptocurrency), consortium blockchain protocols do not rely on mining to add new blocks. Instead, a block is added to the chain by an authorized entity, and the cryptographic technology to chain blocks may considerably differ from public blockchain protocols that utilize mining.

In the example shown in FIG. 1B, the chain of blocks is started by a genesis block 122, which is the first block of the chain ("Block_0"). The example genesis block 122 includes a data block ("Data Block #0"), and a digital signature for the data block. In the process of forming each new block for the chain, a hash of the previous block in the chain is computed by applying a hash function to the previous block; and the hash is appended to the new data block. As shown in FIG. 1B, the action block 124A ("Block_1") is chained from the genesis block 122; the action block 124A includes a new data block ("Data Block #1") and a hash of the prior block (Hash(Block_0)). The hash of the genesis block 122 is generated by computing Hash(Block_0). Here, Hash(•) represents an output hash value generated by applying a cryptographic hash function to an input value (e.g., "Block_0"). In some implementations, one or more conventional hash functions in the SHA-2 family (e.g., SHA-256, SHA-512) or SHA-3 family can be used. Additional or different hash functions may be used.

In the process of forming each new block for the chain, a digital signature of the new data block and the hash of the prior block is generated; and the digital signature is appended to the new data block and the hash of the prior block. As shown in FIG. 1B, a digital signature is generated based on the concatenation of the new data block ("Data Block #1") and the hash (Hash(Block_0)), and the digital signature is appended to form the action block 124A. Typically, a digital signature is generated by a digital signature algorithm operating on inputs that include a private key of the signing entity and a message to be signed (e.g., the data block and the hash shown in FIG. 1B.). The digital signature may be generated according to any suitable digital signature algorithm (e.g., RSA, DSA, ECDSA, lattice-based digital signature algorithms, etc.).

Each subsequent block of the chain may be generated using a similar process. As shown in FIG. 1B, an action block 124B ("Block_n") is chained from the prior block ("Block_(n−1)"), and the action block 124B includes a new data block ("Data Block #n") and a hash of the prior block. Also shown in FIG. 1B, a digital signature is generated based on the concatenation of the new data block ("Data Block #n") and the hash ("Hash(Block_(n−1))"), and the digital signature is appended to form the action block 124B.

In the example shown in FIG. 1B, the hash of the previous block unambiguously specifies the link between two blocks (e.g., genesis block 122 and action block 124A), and the digital signature ensures the integrity of the new block and the link from the previous block. As shown by the examples in FIGS. 2, 3, 4, 5A and 5B and the related discussion below, the type of data structure and methodology represented in FIG. 1B for building a chain of blocks may be used as a basis to construct a multiple-entity root of trust.

In some implementations, constructing a multiple-entity root of trust (e.g., according to the examples in FIGS. 2, 3, 4, 5A and 5B) builds trust among a network of entities represented by nodes in a communication system. For example, each of the nodes may represent a CA entity or an end entity. The communication channels connecting the nodes may be assumed to be open and public, where no security is applied. The entities represented by the nodes may comprise a community, where some hierarchy may exist in terms of CAs and end entities. A consortium may be formed by a group of entities (e.g., within a community or otherwise) to establish a root of trust. In an example, a consortium may be led by a government entity. In another example, certificate authorities (CAs) may be different manufacturers or service providers (e.g., competing brands) from the same industry (e.g., the automotive industry, the banking industry, etc.) that form the consortium. In some cases, members of the consortium include entities in different countries, e.g., to allow mobile phone use in the different countries that may have different authentication systems. Having a multiple-entity root of trust can provide a solution in these and other types of authentication scenarios since there is no single CA in charge. Additionally, new companies (or other types of entities) may be established, and previous companies may go out of business which may affect the consortium membership. This scenario is also addressed by the multiple-entity root of trust, which is not static and may evolve with a change in membership.

When building a genesis block for a multiple-entity root of trust system, genesis block data entries for each consortium member can be collected to form a data entry array.

Then, the array is concatenated with one or more digital signatures. Thus, a genesis block can be made of the following components: an array of genesis block data entries, and one or more digital signatures. FIGS. 3 and 4 are diagrams of example genesis blocks 300, 400 of a multiple-entity root of trust. Another type of genesis block may be used in some cases.

When building a chained block (e.g., an action block) in a multiple-entity root of trust system, chained block data entries can be collected to form an array. Then, the array is concatenated with a hash of the previous block. The concatenated data then is further concatenated with one or more digital signatures. Thus, a chained block can be made of the following components: a data entry or an array of data entries, a hash of the previous block, and one or more digital signatures. FIGS. 5A and 5B show a diagram of an example chain of blocks of a multiple-entity root of trust.

In some implementations, the genesis block creation process includes communication of data among and between founding members (e.g., entities in the consortium discussed above). In some cases, since there is not necessarily any secret information in what is communicated, an open public channel may be used to communicate this information. In some examples, the creation of the genesis block is performed by executing the following steps (steps may be performed in the order shown or in another order, or in series or in parallel in some cases):

1. Select a manager for the collection of data entries.
2. Each member's identity and public key is digitally signed by another member, and this may be considered a data entry for the genesis block.
3. The manager collects the data entries, forms a data block for the genesis block (e.g., an array of the data entries generated at Step 2), and digitally signs the data block.
4. The manager sends the signed data block to other members to have it further digitally signed by those members.
5. The manager publishes the genesis block.

To facilitate the block construction of a genesis block, one of the founding members of the consortium can be selected as the manager to lead the process of creating the genesis block, as noted in Step 1 above. In some cases, the founding members may meet and agree to delegate the genesis block creation task to one of the members, acting as a manager. The manager does not have the power to alter the information contained in the genesis block. Furthermore, the resultant genesis block will be shared among the founding members, where the members may check the validity of the block to ensure its integrity. Thus, the manager can be any founding member, but appointing a manager does not create a single point of failure.

Figure 2:
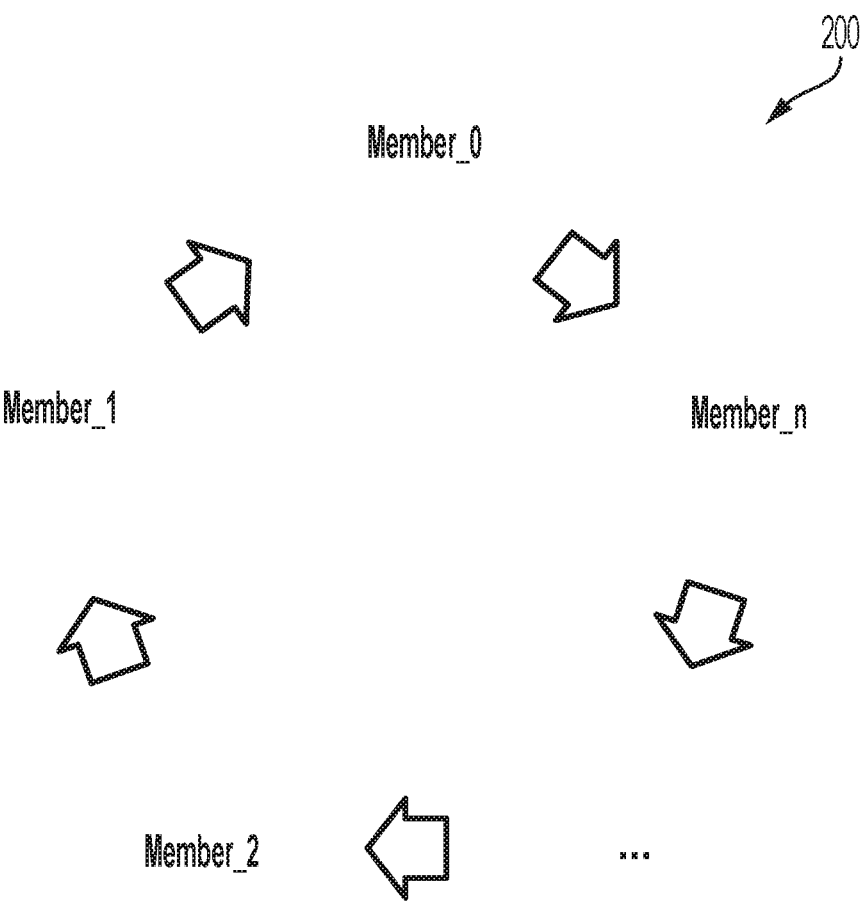
FIG. 2 is an illustration of an example ring signing process for a multiple-entity root of trust.

In the creation of the genesis block described above, Step 2 can be performed to create data entries for each member of the consortium (each founding member). Creating the data entries for each member, where each data entry comprises a member's identity and public key signed by another member, may be performed, for example, in a similar manner as a Certificate Signing Request (CSR) based on PKCS #10 (see e.g. https://tools.ietf.org/html/rfc2986). The (signed) genesis block data entry for a member is sent to the manager (instead of, e.g., the owner of the public key). In some cases, multiple signatures can be required for each pair of identity and public key, although a single digital signature per pair of identity and public key may suffice. Multiple signatures can be accomplished by multiple executions of Step 2, for example. In some contexts, the most computationally and bandwidth efficient way to perform Step 2 is to perform this signing process in a ring manner, where each member's identity and public key set is signed by exactly one other member as shown in FIG. 2. The signing process of Step 2 may be performed in another manner. For instance, each signing may occur asynchronously and independently.

In the creation of the genesis block described above, the set of data comprising the identity, public key, and digital signature for each founding member is collected by the manager in Step 3. The manager validates all the signatures and forms a data block, e.g., the array of data entries shown in FIG. 3. In the example shown in FIG. 3, data entries for each member, Member0, Member1, . . . MemberN, are concatenated to form an array of the data entries. The array of data entries is then digitally signed by the manager to form the genesis data block. For example, the manager's digital signature can be generated using the manager's private key and the array of data entries, and the manager's digital signature can then be appended to the array of data entries to form the genesis data block.

The example genesis block 300 shown in FIG. 3 includes an array of genesis block data entries 302A, 302B, 302C that form a genesis data block. The genesis block data entries 302A, 302B, 302C represent respective member entities of the root of trust consortium. In the example shown, there are N member entities (Member0, Member1, Member1, . . . MemberN), where N may generally be any integer greater than 1.

In the example shown in FIG. 3, each genesis block data entry 302A, 302B, 302C includes an identifier of the member entity represented by the genesis block data entry. For example, genesis block data entry 302A represents Member0 and includes an identifier ("ID_Member0") of Member0; genesis block data entry 302B represents Member1 and includes an identifier ("ID_Member1") of Member1; etc. The identifier can be, for example, a text string, an integer, or any other type of label or name in any appropriate form or format.

In the example shown in FIG. 3, each genesis block data entry 302A, 302B, 302C also includes a public key of the member entity represented by the genesis block data entry. For example, genesis block data entry 302A represents Member0 and includes the public key ("Public_Key_Member0") of Member0; genesis block data entry 302B represents Member1 and includes the public key ("Public_Key_Member1") of Member1; etc. The public key can be, for example, the public key of a public-private key pair generated for use in a cryptography system (e.g., according to a key generation protocol specified by the cryptography system).

In the example shown in FIG. 3, each genesis block data entry 302A, 302B, 302C also includes a digital signature of another member entity (i.e., a member of the root of trust consortium other than the member represented by the genesis block data entry). For example, genesis block data entry 302A represents Member0 and includes the digital signature of Member1 ("Signature_Member1(ID_Member0, Public_Key_Member0)"); genesis block data entry 302B represents Member1 and includes the digital signature of Member1 ("Signature_Member2(ID_Member1_Public_Key_Member1)"); etc. The digital signature of the other entity can be generated by the other entity using the other entity's own private key. In some cases, a digital signing protocol can be applied to an input message that includes the identifier and the public key. For example, the digital signature of Member1 in the genesis block data entry 302A is generated using Member1's private key in a digital signature protocol applied to an input that includes "ID_Member0" and "Public_Key_Member0".

In some aspects of operation, the genesis block data entries 302A, 302B, 302C are obtained from the member entities of the root of trust consortium. For example, the manager of the consortium may obtain the genesis block data entries 302A, 302B, 302C from the member entities by initiating the ring signing process 200 shown in FIG. 2 or another type of process. In the ring signing process 200, each member generates a digital signature for one of the genesis block data entries, and therefore each genesis block data entry includes a digital signature of a distinct member entity. The manager entity can then validate the digital signatures in each of the genesis block data entries 302A, 302B, 302C before providing the genesis block for use as a root of trust.

The genesis block 300 shown in FIG. 3 is generated for the root of trust consortium based on the genesis data block, which in the example shown, is an array of genesis block data entries 302A, 302B, 302C. Generating the genesis block 300 includes digitally signing the genesis data block. In the example shown in FIG. 3, digitally signing the genesis data block includes generating a digital signature 304 of a manager of the root of trust consortium and appending the manager's digital signature 304 to the genesis data block. The digital signature of the manager can be generated by the manager using the manager's own private key. For example, a digital signing protocol can be applied to an input message that includes the array of genesis block data entries 302A, 302B, 302C.

As shown in FIG. 4, in the creation of the genesis block 400, the genesis data block 402 can be digitally signed by one or more other founding members, e.g. Member0 . . . MemberM, after the genesis data block 402 has been signed by the manager, for example, to provide data integrity and further avoid a single point of failure. The array of genesis block data entries 302A, 302B, 302C shown in FIG. 3 can be used as the genesis data block 402 in FIG. 4, which is signed by one or more other founding members. When multiple member signatures on the block are needed, the manager may send the genesis data block 402 to each other member over a public channel to have the genesis data block 402 digitally signed by that member. The assigned member validates the signature, verifies the validity of the data entries, signs the block, and returns it with its signature appended. By repeating this process, the manager can complete the creation of a genesis block 400 shown in FIG. 4.

In some aspects of operation, the genesis data block 402 is sent to a subset (i.e., one, some or all) of the member entities other than the manager. The manager may receive digital signatures 406A, 406B from the subset of member entities, where each of the digital signatures 406A, 406B may be generated by a respective one of the member entities based on the genesis data block 402. The genesis block 400 may then be generated by combining the received digital signatures 406A, 406B, the digital signature of the manager 404 and the genesis data block 402.

Once the genesis block is created, additional data blocks in the chain may be constructed. A root of trust can be represented by a chain of blocks stemming from the genesis block, where any changes to the root of trust consortium, e.g. additions or deletion of member in the consortium, are recorded by the chained blocks. In the example shown in FIG. 5, a single block is added to the last block of the chain at a time, e.g. per round, creating a single thread chain. For instance, the chain of blocks can be deployed as an append-only chain, where no removal of a block from the chain is permitted. This means that the blocks are chained in a chronological order, where the last block is the latest. Therefore, in order to validate a signature by a member claiming to belong to the root of trust consortium, one can trace the chain from the last block to find the first (i.e. latest) appearance of this member's identity that is associated with a valid public key and use the public key to validate the signature.

Like the genesis block creation, a manager to lead the process of chaining a block can be selected (e.g., for a current round). This manager for creating a chained block may be the same or different from the genesis block creation manager. Also, in some cases, different managers may be selected for different blocks. This may be important, for example, if a member is removed from the root of trust consortium or in other scenarios. In some implementations, all communication for constructing blocks may be executed over open public channels.

In some examples, the following steps can be taken to add a new block (e.g., an action block) to a chain of existing blocks (steps may be performed in the order shown or in another order, or in series or in parallel in some cases):

1. Identify the manager.
2. The manager collects data entries, creating a data entries array.
3. Data entries array is concatenated with a hash of the previous block.
4. The manager has the concatenation of the array and the hash, digitally signed by one or more member.
5. The manager publishes the chain of blocks that contains the new block.

Accordingly, each time a new block (e.g., an action block) is added, a hash of an existing block of the chain is obtained (e.g., by applying a hash function to the most recently added block); a new data block comprising a new data entry is generated, such that the new data entry identifies an action by one or more member entities of the root of trust consortium; and the new block is generated by digitally signing a combination (e.g., a concatenation) of the new data block and the hash of the existing block. The digital signing may include the application of multiple digital signatures (e.g., digital signatures of the manager entity and one or more other member entities). The new block is then provided for use (e.g., with the other blocks of the chain) by one or more end entities as the root of trust in the cryptography system.

In some examples, data entries containing data for an action such as, for example, the addition of a new member, or update, replacement, or addition of a public key of an existing member can be reported to the current round's manager. In some examples, the owner of the new public key presents its digital signature to prove the possession of the corresponding private key, e.g. in a similar manner as PKCS #10. Other types of actions such as, for example, revocation or cancelation of a public key, or removal of a member, may also be reported to the manager to initiate the block chaining process.

A genesis block and chained blocks may have different data structures of their respective data blocks. In some cases, the data structure of the genesis and chained blocks may have certain fields in common, namely, an identity field, a public key field, and a signature field. In some cases, this part of the block may resemble an X.509 certificate, or any other digital certificate format. For instance, the format and encoding of X.509, or any other digital certificate, may be used to represent this part of a data block, although more straightforward encoding can be used as well. However, in some cases, unlike X.509, multiple signatures may be applied to the data block.

In some examples, the identity field includes identity information data regarding an entity. The public key data field may have a data structure comprising components including, for example, a cryptosystem with domain parameters that the public key belongs to, a public key, and an expiry date, that in some cases, may include a time of expiry or other representation of time, e.g. duration. The digital signature data structure may include components, including, for example, an identity of a signer, a cryptosystem with domain parameters that the signature is generated over, a digital signature, and a time stamp.

A genesis block may include an array of one or more data entries for each member, for example, as in the example genesis data block 300 shown in FIG. 3. Each data entry in a genesis block can include the identity field, public key field, and one or more signature fields. Other fields may be included in the data blocks, for example, depending on the particular context or implementation.

Similar to the genesis block, each chained data block (e.g., block 502A, block 502B, block 502C shown in FIGS. 5A and 5B) includes one or more data entries. As shown in FIG. 5, the data entries in the chained blocks include an additional field, e.g. an action type field. The action type field identifies an action by one or more members entities of the root of trust consortium. An action type field may be omitted from a genesis block, e.g. because the genesis block data entry is implicitly indicated as "new." For example, a genesis block may be viewed as an action to add new members. A chained block data structure may also comprise an identity field, public key field, and optionally, one or more signature fields, as discussed above. A digital signature on each entry is optional because, in some cases, a digital signature on the entire block suffices, and may also be more efficient than a digital signature on each entry.

In some implementations, the multiple-entity root of trust system defines action types that can be recorded in the chain of blocks. Examples of the possible action types that can be identified in a data entry include:

1. adding a new member ("new")
2. removing a member ("remove")
3. updating a public key ("update")
4. revoking a public key ("revoking")
5. replacing a public key after revocation ("replace")
6. adding a public key ("add"), and
7. canceling an old public key ("cancel")
8. timestamp ("timestamp")
9. known status ("status")
10. freeze ("freeze") and
11. unfreeze ("unfreeze").

In some cases, other types of actions may be defined and utilized. Examples of how the action types listed above may be defined and utilized will now be described. These and other action types may be implemented in another manner.

The action of "new" is used to add a new member. For example, this action indicates that this member did not exist in the root of trust consortium. Thus, a new identity along with its associated public key appears in a data entry.

The action of "remove" is used to remove a member from the root of trust consortium. This is a stronger action than revoking a public key because it indicates that the member is not behaving, and not that simply its private key was compromised. In this case, there is no need for a public key, and including the identity of the misbehaving member suffices.

The action of "update" is used when a public key is about to expire. Thus, this action enables a grace period where the two public keys of the same cryptosystem with the same security strength co-exist for an identity until the old one expires. The updated public key can be specified in the data entry.

The actions of "revoke" prompts immediate invalidation of the public key. The revoked public key is specified in the data entry. Once a public key is revoked, owner of this public key may be reactivated by the "replace" action. The replacing public key can be specified in the data entry.

The action of "add" allows for adding a second public key for an existing identity, for example, creating a situation where a member owns two valid public keys simultaneously. This can be useful in a migration scenario, where the second public key belongs to a different cryptosystem, or to the same cryptosystem but with a different security strength. The second public key is for the new cryptosystem, or the security strength, or both, that the system is migrating to.

The old public key in the migration initiated by the "add" action can be deactivated by the "cancel" action. In some implementations, "revoke" may be used to indicate this "cancel" action.

The "timestamp" action may be used to indicate that the chain is up-to-date and was correct at the published time and date. A consortium would be free to choose a suitable interval to publish "timestamp" blocks. In some implementations, the absence of recent "timestamp" blocks in the published chain could be interpreted by a client as an indication that the latest blocks of the chain have been withheld or not published.

The "status" action may be used to record a summary of all currently valid identity information. Such a block may be redundant, as it contains information that is calculable from earlier blocks. A "status" block can be considered as an intermediate genesis block. Consumers (especially on constrained devices) could validate a status block per normal when received. Future chain validation would work from the current end of the chain to a previously validated status block allowing a reduction in work required to verify trust. The entire chain would still be available for cases where complete validation was desired.

The "freeze" action is optional. This action indicates that a new block will not be updated, i.e., no actions will be taken, for a certain amount of time. Thus, this action block must associate the time period, or the expiration time, of the frozen period. This time may be used to allow the members to synchronize the chain of blocks. Also, optionally, no time may be specified, indicating that the chain of block is frozen indefinitely. This can be used to terminate the chain, for example.

The "unfreeze" action is optional. This action is used only when accidental or malicious use of "freeze" action is detected. This action can undo such a "freeze" action.

In some implementations, the action types introduced above for managing members and public keys provides functionality to migrate to a new cryptosystem accomplishing cryptographic agility. For example, when migration of a public key algorithm from an old one to a new one is needed, the action types allow for the fast addition of a second public key for a new identity, creating a migration period, and a defined method to revoke the old public key later on, when migration is complete.

In some implementations, a multiple-entity root of trust mechanism allows digital signatures on each data entry as well as an entire block. To avoid a single point of failure, the multiple-entity root of trust system may ensure that each data entry is protected by digital signatures from two or more members; otherwise a compromise of a member can alter the root of trust data.

The consistency in the state of valid and revoked certificates, as viewed by consortium members, can come from the fact that in each round a single elected authority (the manager) constructs the new block and chains it to the latest published block. As a result, unlike public block chains that utilize mining, a fork is not possible in the multiple-entity root of trust mechanism.

In some cases, a multiple-entity root of trust system allows a hierarchical structure, where there is freedom in the structure of the sub-level. For example, the level below the consortium root of trust can be another chain of blocks rather than a PKI subsystem, or it may be a mixture of them. This system allows for a mixture of layers of PKI subsystems and chain of blocks. In some cases, a multiple-entity root of trust system can be deployed without a subsystem. For example, the system may be completely flat, where members in the consortium root of trust are end entities rather than CAs.

FIGS. 5A and 5B are diagrams showing an example process for adding new blocks to a chain 500 that has been provided as a multiple-entity root of trust. The example chain 500 includes a series of chained blocks, including block 502A ("Block_(i−1)"), block 502B ("Block_i") and block 502C ("Block_(i+1)"). Each block contains one or more data entries. For example, block 502A includes data entry 510A, data entry 510B, data entry 510C and possibly other data entries. In the example shown, each data entry includes information that identifies an action type, an identity, a public key, and one or more digital signatures.

The action type identified in a data entry may indicate one or more of the example actions described above. For instance, the action can be or include one or more of the following action types: adding a new member to the root of trust consortium; removing a member from the root of trust consortium; updating a public key of a member of the root of trust consortium; revoking a public key of a member of the root of trust consortium; replacing a public key of a member of the root of trust consortium; adding an additional public key of a member of the root of trust consortium; canceling a public key of a member of the root of trust consortium; timestamping a valid state of the chain; recording a summary of all currently valid identity information; freezing the block; unfreezing the block; or another type of action.

Each block 502A, 502B, 502C in the chain 500 also includes a hash of the previous block. For example, data block 502B ("Block_i") includes a hash 512 of the previous block 502A ("Hash(Block_(i−1))"). The data entry (or the array of entries) in the data block is then combined (e.g., concatenated) with the hash of the previous block to form a data block, and the data block is then signed one or more times to form the new block of the chain.

In the example shown, the block 502B includes the digital signature 514 of the manager ("Signature_Manager(Data_Block_i)"), the digital signature 516 of another member entity ("Signature_Member(Data_Block_i)"), and possibly the digital signatures of additional member entities appended to the data block. Digital signatures may be generated on a data entry, the entire data block, or both. In some cases, the minimum number of required signatures on a block depends on a particular network's level of trust in its members. The higher this threshold is, the fewer are the points of failure. In some cases, when there is only a single entry in a block, a signature is needed only on the block. For example, if block 502A had only one entry, then only one signature on the data block may be needed, and a signature on the data entry does not have an additional effect. In some cases, the manager may send the data block to one or more other members to sign. Similar steps would be performed to construct each subsequent block in the chain, e.g. block 502C ("Block_(i+1)") shown in FIG. 5B.

Accordingly, digitally signing the combination of the data block and the hash of the existing (prior) block may include generating a digital signature 514 of a manager of the root of trust consortium, and appending the digital signature 514 of the manager to the data block. The data block may be sent to a subset (i.e., one, some or all) of the member entities, and digital signatures may be received from the subset of the member entities, where each of the digital signatures (e.g., digital signature 516) is generated by a respective one of the member entities based on the data block. The received digital signatures (e.g., digital signature 516) can then be combined with the digital signature 514 of the manager and the data block to form the new block 502B for the chain.

Some of the operations described in this specification can be implemented as operations performed by a computer system or a data processing apparatus executing computer-readable instructions, e.g., a computer program.

Figure 6:
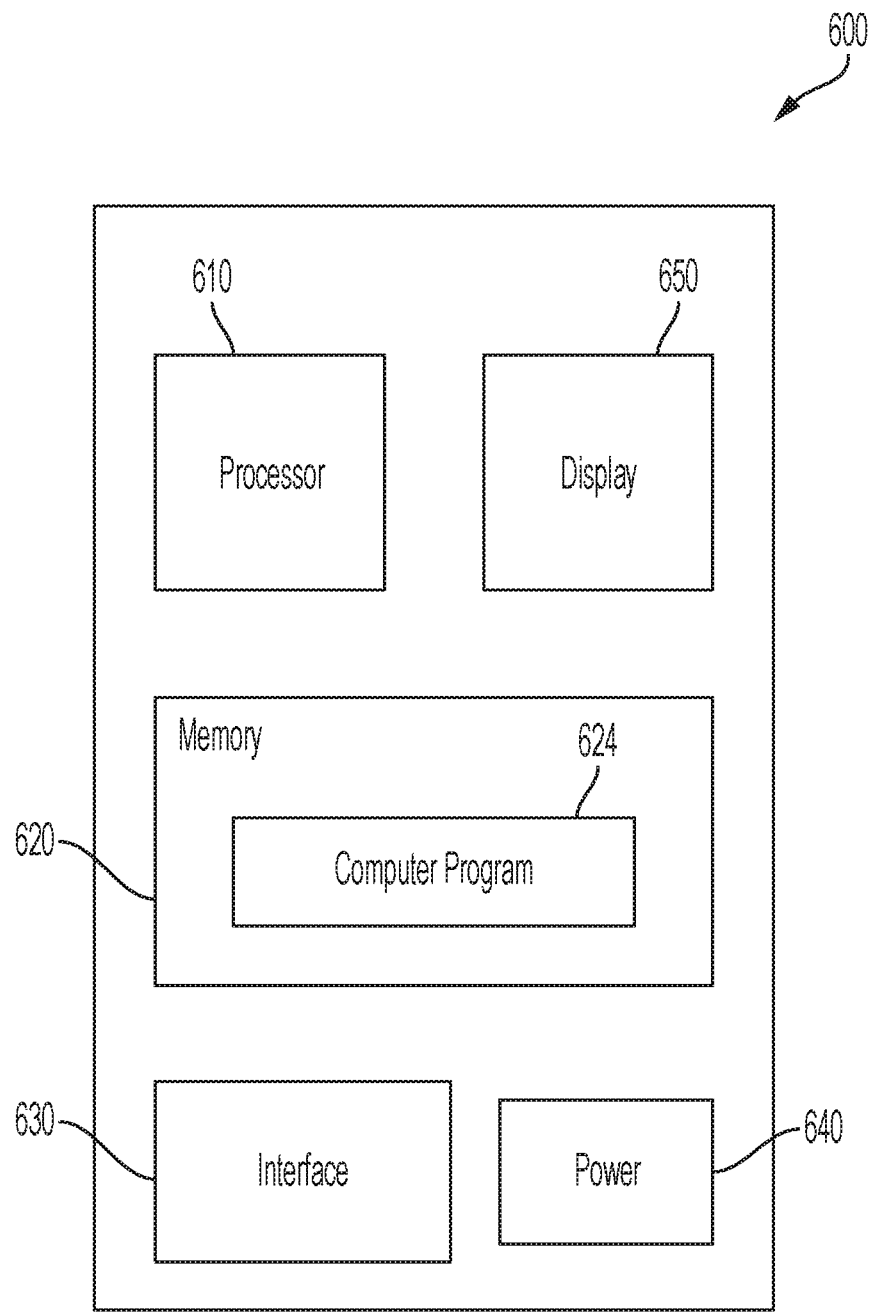
FIG. 6 is a block diagram of an example computer system.

FIG. 6 is a block diagram showing an example of a computer system 600 that includes a data processing apparatus and one or more computer-readable storage devices. The term "data-processing apparatus" encompasses all kinds of apparatus, devices, nodes, and machines for processing data, including by way of example a programmable processor, a computer, a system on a chip, or multiple ones, or combinations, of the foregoing, e.g. processor 610. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g. computer program 624, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g. processor 610, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g. memory 620. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 640 provides power to the other components of the computer system 600. For example, the other components may operate based on electrical power provided by the power unit 640 through a voltage bus or other connection. In some implementations, the power unit 640 includes a battery or a battery system, for example, a rechargeable battery. In some implementations, the power unit 640 includes an adapter (e.g., an AC adapter) that receives an external power signal (from an external source) and coverts the external power signal to an internal power signal conditioned for a component of the computer system 600. The power unit 640 may include other components or operate in another manner.

To provide for interaction with a user, operations can be implemented on a computer having a display device, e.g. display 650, (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The computer system 600 may include a single computing device, or multiple computers that operate in proximity or generally remote from each other and typically interact through a communication network, e.g. via interface 630. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

The example interface 630 may provide communication with other systems or devices. In some cases, the interface 630 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 630 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect, a multiple-entity root of trust is generated or modified, and provided for use by end entities in a cryptography system.

In a first example, a genesis data block is generated. The genesis data block includes genesis block data entries representing respective member entities of a root of trust consortium. Each genesis block data entry includes an identifier of the member entity represented by the genesis block data entry; a public key of the member entity represented by the genesis block data entry; and a digital signature of another member entity (i.e., other than the member entity represented by the genesis block data entry). A genesis block is generated for the root of trust consortium based on the genesis data block. Generating the genesis block includes digitally signing the genesis data block. The genesis block is provided for use by one or more end entities as a root of trust in a cryptography system.

In some cases, implementations of the first example may include one or more of the following features. Digitally signing the genesis data block may include generating a digital signature of a manager of the root of trust consortium and appending the digital signature of the manager to the genesis data block. The genesis data block may be sent to a subset (i.e., one, some or all) of the member entities other than the manager. Digital signatures may be received from the subset of member entities, where each of the digital signatures is generated by a respective one of the member entities based on the genesis data block. Generating the genesis block may include combining the received digital signatures, the digital signature of the manager and the genesis data block.

In some cases, implementations of the first example may include one or more of the following features. The genesis block data entries are obtained from the member entities. Obtaining the genesis block data entries from the member entities may include initiating a ring signing process (e.g., as shown in FIG. 2) or another type of signing process. Each genesis block data entry may include a digital signature of a distinct entity (e.g., as the example shown in FIG. 3). The genesis block data entries may be validated (e.g., by v the digital signatures of the member entities, or otherwise) before providing the genesis block for use as a root of trust.

In some cases, implementations of the first example may include one or more of the following features. A chain comprising the genesis block is provided as the root of trust. A hash of an existing block of the chain is obtained (e.g., by applying a hash function to the existing block). A new data block comprising a new data entry is generated. The new data entry identifies an action by one or more member entities of the root of trust consortium. A new block of the chain is generated. Generating the new block includes digitally signing a combination of the new data block and the hash of the existing block. The new block is provided for use, by one or more end entities, as the (updated) root of trust in the cryptography system.

In a second example, a hash of an existing block of a chain provided by a root of trust consortium is obtained. A data block comprising a data entry is generated. The data entry identifies an action by one or more member entities of the root of trust consortium. A new block of the chain is generated. Generating the new block includes digitally signing a combination of the data block and the hash of the existing block. The new block is provided for use, by one or more end entities, as a root of trust in a cryptography system.

In some cases, implementations of the second example may include one or more of the following features. The data entry may include an identifier of an action type, an identity of a member entity, a public key of the member entity, and a digital signature. The digital signature in each data entry is validated before providing the new block for use as a root of trust. The data block includes multiple data entries identifying multiple actions by one or more of the member entities.

In some cases, implementations of the second example may include one or more of the following features. The action can be or include one or more of the following action types: adding a new member to the root of trust consortium; removing a member from the root of trust consortium; updating a public key of a member of the root of trust consortium; revoking a public key of a member of the root of trust consortium; replacing a public key of a member of the root of trust consortium; adding an additional public key of a member of the root of trust consortium; canceling a public key of a member of the root of trust consortium; timestamping a valid state of the chain; recording a summary of all currently valid identity information; freezing the block; and unfreezing the block.

In some cases, implementations of the second example may include one or more of the following features. Digitally signing the combination of the data block and the hash of the existing block may include generating a digital signature of a manager of the root of trust consortium, and appending the digital signature of the manager to the data block. The data block may be sent to a subset (i.e., one, some or all) of the member entities. Digital signatures may be received from the subset of the member entities, where each of the digital signatures is generated by a respective one of the member entities based on the data block. Generating the new block may include combining the received digital signatures, the digital signature of the manager and the data block.

In a third example, a computer system includes one or more processors and a memory. The memory stores instructions that are operable when executed by the one or more processors to perform one or more operations of the first example, of the second example, or both. In a fourth example, a computer-readable medium stores instructions that are operable when executed by data processing apparatus to perform one or more operations of the first example, of the second example, or both.

In some aspects, methods and systems are provided for constructing a chain of blocks and managing the chain of blocks according to a list of root of trust entities (members of a root of trust consortium). In some cases, a genesis block is constructed with data entries for each member in the list of root of trust entities. In another example, a new data block is constructed with one or more data entries, in which each entry includes an action type field indicating a change (e.g., a change in membership of the list of root of trust entities, a change to a public key of a member or another change). The new data block is chained from the genesis block or a subsequent block in the chain of blocks.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
   obtaining an array of data entries representing respective member entities of a root of trust consortium, each data entry of the array being a data structure comprising:
   an identifier of the member entity represented by the data entry;
   a public key of the member entity represented by the data entry; and
   a digital signature of a member entity other than the member entity represented by the data entry, wherein the digital signature is applied to the identifier and the public key; and
   wherein obtaining the array of data entries comprises initiating a ring signing process where each member entity generates a digital signature for a respective one of the data entries so that each digital signature in the array of data entries is generated by a distinct member entity;
   generating a genesis block of a block chain associated with the root of trust consortium, wherein the genesis block comprises the array of data entries and a digital signature of a manager of the root of trust consortium, and generating the genesis block comprises: generating the digital signature of the manager; and
   appending the digital signature of the manager to the array of data entries; and
   providing the block chain comprising the genesis block for use, by one or more end entities, as a root of trust in a cryptography system,
   wherein using the block chain as a root of trust comprises issuing and validating a digital certificate based on the block chain.

2. The method of claim 1, further comprising:
   sending the genesis data block to a subset of the member entities;

receiving digital signatures from the subset of the member entities, wherein each of the digital signatures is generated by a respective one of the member entities based on the genesis data block; and wherein generating the genesis block comprises combining the received digital signatures, the digital signature of the manager and the genesis data block.

3. The method of claim 1, further comprising validating the array of data entries before providing the genesis block for use as a root of trust.

4. The method of claim 1, further comprising:
obtaining a hash of an existing block of the block chain;
generating a new data block comprising a new data entry, the new data entry identifying an action by one or more member entities of the root of trust consortium;
generating a new block of the block chain for the root of trust consortium, wherein generating the new block comprises digitally signing a combination of the new data block and the hash of the existing block; and
providing the new block to update the block chain for use, by the one or more end entities, as the root of trust in the cryptography system.

5. The method of claim 4, wherein the new data entry comprises an identifier of an action type, an identity of a member entity, a public key of the member entity, and a digital signature.

6. The method of claim 5, further comprising validating the digital signature in the new data entry before providing the new block for use as a root of trust.

7. The method of claim 4, wherein the new data block comprises multiple data entries identifying multiple actions by one or more of the member entities.

8. The method of claim 4, wherein the action comprises at least one of:
adding a new member to the root of trust consortium;
removing a member from the root of trust consortium;
updating a public key of a member of the root of trust consortium;
revoking a public key of a member of the root of trust consortium;
replacing a public key of a member of the root of trust consortium;
adding an additional public key of a member of the root of trust consortium;
canceling a public key of a member of the root of trust consortium;
timestamping a valid state of the block chain;
recording a summary of all currently valid identity information;
freezing the block chain; or
unfreezing the block chain.

9. The method of claim 4, wherein digitally signing the combination of the new data block and the hash of the existing block comprises:
generating a digital signature of a manager of the root of trust consortium; and
appending the digital signature of the manager to the new data block.

10. The method of claim 9, further comprising:
sending the new data block to a subset of the member entities;
receiving digital signatures from the subset of the member entities, wherein each of the digital signatures is generated by a respective one of the member entities based on the new data block; and wherein generating the new block comprises combining the received digital signatures, the digital signature of the manager and the new data block.

11. A computer system comprising:
one or more processors; and
memory storing instructions that are operable when executed by the one or more processors to perform operations comprising:
obtaining an array of data entries representing respective member entities of a root of trust consortium, each data entry of the array being a data structure comprising:
an identifier of the member entity represented by the data entry;
a public key of the member entity represented by the data entry; and
a digital signature of a member entity other than the member entity represented by the data entry, wherein the digital signature is applied to the identifier and the public key; and
wherein obtaining the array of data entries comprises initiating a ring signing process where each member entity generates a digital signature for a respective one of the data entries so that each digital signature in the array of data entries is generated by a distinct member entity;
generating a genesis block of a block chain associated with the root of trust consortium, wherein the genesis block comprises the array of data entries and a digital signature of a manager of the root of trust consortium, and generating the genesis block comprises;
generating the digital signature of the manager; and
appending the digital signature of the manager to the array of data entries; and
providing the block chain comprising the genesis block for use, by one or more end entities, as a root of trust in a cryptography system,
wherein using the block chain as a root of trust comprises issuing and validating a digital certificate based on the block chain.

12. The computer system of claim 11, wherein digitally signing the genesis data block comprises:
generating a digital signature of a manager of the root of trust consortium; and
appending the digital signature of the manager to the genesis data block.

13. The computer system of claim 12, the operations further comprising:
sending the genesis data block to a subset of the member entities;
receiving digital signatures from the subset of the member entities, wherein each of the digital signatures is generated by a respective one of the member entities based on the genesis data block; and
wherein generating the genesis block comprises combining the received digital signatures, the digital signature of the manager and the genesis data block.

14. The computer system of claim 11, the operations further comprising validating the array of data entries before providing the genesis block for use as a root of trust.

15. The computer system of claim 11, wherein the operations further comprise:
obtaining a hash of an existing block of the block chain;
generating a new data block comprising a new data entry, the new data entry identifying an action by one or more member entities of the root of trust consortium;

generating a new block of the block chain for the root of trust consortium, wherein generating the new block comprises digitally signing a combination of the new data block and the hash of the existing block; and providing the new block to update the block chain for use, by one or more end entities, as a root of trust in a cryptography system.

16. The computer system of claim 15, wherein the new data entry comprises an identifier of an action type, an identity of a member entity, a public key of the member entity, and a digital signature.

17. The computer system of claim 16, the operations further comprising validating the digital signature in the new data entry before providing the new block for use as a root of trust.

18. The computer system of claim 15, wherein the new data block comprises multiple data entries identifying multiple actions by one or more of the member entities.

19. The computer system of claim 15, wherein the action comprises at least one of:

adding a new member to the root of trust consortium;
removing a member from the root of trust consortium;
updating a public key of a member of the root of trust consortium;
revoking a public key of a member of the root of trust consortium;
replacing a public key of a member of the root of trust consortium;
adding an additional public key of a member of the root of trust consortium;
canceling a public key of a member of the root of trust consortium;
timestamping a valid state of the block chain;
recording a summary of all currently valid identity information;
freezing the block chain; or
unfreezing the block chain.

20. The computer system of claim 15, wherein digitally signing the combination of the new data block and the hash of the existing block comprises:

generating a digital signature of a manager of the root of trust consortium; and
appending the digital signature of the manager to the new data block.

21. The computer system of claim 20, the operations further comprising:

sending the new data block to a subset of the member entities;
receiving digital signatures from the subset of the member entities, wherein each of the digital signatures is generated by a respective one of the member entities based on the new data block; and
wherein generating the new block comprises combining the received digital signatures, the digital signature of the manager and the new data block.

* * * * *